United States Patent
Choi

(10) Patent No.: US 9,103,906 B2
(45) Date of Patent: Aug. 11, 2015

(54) RADAR APPARATUS UTILIZING MULTIPLE TRANSMISSION CHANNELS

(71) Applicant: MANDO CORPORATION, Pyeongtaek-si, Gyeonggi-do (KR)

(72) Inventor: Seung Un Choi, Suwon-si (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 300 days.

(21) Appl. No.: 13/918,502

(22) Filed: Jun. 14, 2013

(65) Prior Publication Data

US 2013/0342385 A1 Dec. 26, 2013

(30) Foreign Application Priority Data

Jun. 25, 2012 (KR) .................. 10-2012-0067884

(51) Int. Cl.
- *G01S 13/02* (2006.01)
- *G01S 7/03* (2006.01)
- *H01Q 21/00* (2006.01)
- *H01Q 21/06* (2006.01)
- *G01S 13/42* (2006.01)
- *G01S 13/93* (2006.01)

(52) U.S. Cl.
CPC .................. *G01S 13/02* (2013.01); *G01S 7/032* (2013.01); *H01Q 21/0006* (2013.01); *H01Q 21/06* (2013.01); *G01S 13/42* (2013.01); *G01S 13/931* (2013.01); *G01S 2013/9389* (2013.01)

(58) Field of Classification Search
CPC ... G01S 2013/0254; G01S 7/03; G01S 7/032; H01Q 21/0006
USPC ........................................ 342/153; 343/700 R
See application file for complete search history.

(56) References Cited

U.S. PATENT DOCUMENTS

2010/0073260 A1* 3/2010 Fujita ............................ 343/904

FOREIGN PATENT DOCUMENTS

| CN | 101685907 A | 3/2010 |
| CN | 101813766 A | 8/2010 |

* cited by examiner

*Primary Examiner* — Timothy A Brainard
(74) *Attorney, Agent, or Firm* — McDermott Will & Emery LLP

(57) ABSTRACT

The present invention relates to a radar apparatus utilizing multiple transmission channels having the structure enabling multiple transmission channels only by using only the number of transmission RF ports as many as the number of the transmission channels.

4 Claims, 1 Drawing Sheet

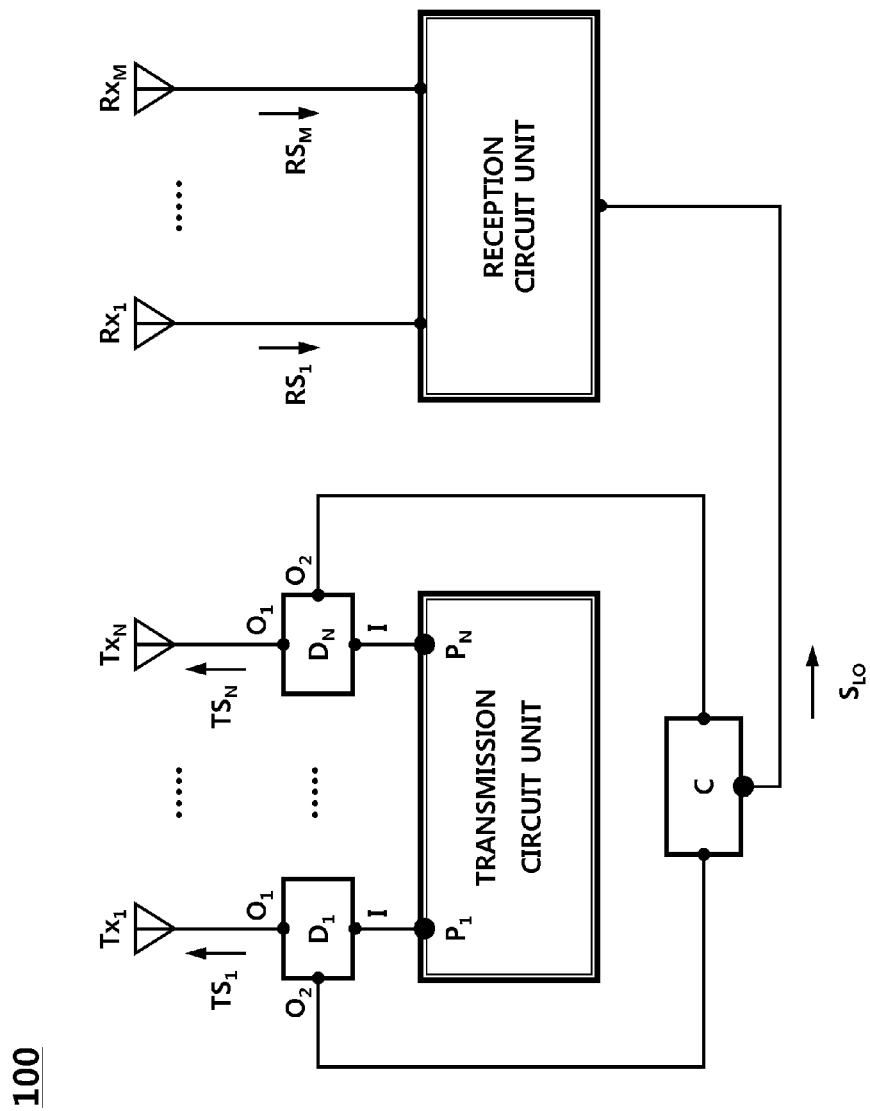

RADAR APPARATUS UTILIZING MULTIPLE TRANSMISSION CHANNELS

CROSS-REFERENCE TO RELATED APPLICATION

This application claims priority from and the benefit under 35 U.S.C. §119(a) of Korean Patent Application No. 10-2012-0067884, filed on Jun. 25, 2012 which is hereby incorporated by reference for all purposes as if fully set forth herein.

BACKGROUND OF THE INVENTION

1. Field of the invention

The present invention relates to a radar apparatus.

2. Description of the Prior Art

A recent radar apparatus used for a vehicle or an industrial field has to be miniaturized since it has to be mounted on a bumper of the vehicle or a grill portion.

However, the radar apparatus used for the vehicle generally is designed to have a very precise and complicated RF front end structure with 24 to 77 GHz frequency bands, and this practically constraining its miniaturization.

Recently, lots of techniques have been developed to further miniaturize the size of the radar apparatus with this unavoidably complicated design structure.

A multiple transmission channels are adopted to improve the feature of the radar apparatus. The multiple transmission channel structure requires an additional reference transmission signal necessary to calculate a difference between a transmission signal and a reception signal.

Therefore, the radar apparatus implementing the multiple transmission channels requires at least one additional transmission RF port for the reference transmission signal to calculate the difference between the transmission signal and the reception signal in addition to transmission RF ports as many as the number of the multiple transmission channels.

That is, at least N+1 transmission RF ports are necessary for implementing N transmission channels.

This constrains miniaturization of the radar apparatus and also prevents an implementation of a desired number of transmission channels, or causes a disadvantage of necessity for an additional circuit such as an active circuit to implement an additional transmission RF port synchronized with the other transmission channels.

SUMMARY OF THE INVENTION

Accordingly, the present invention has been made to solve the above-mentioned problems occurring in the prior art, and an object of the present invention is to provide a radar apparatus capable of utilizing multiple transmission channels having transmission RF ports just as many as a number of transmission channels.

In order to accomplish the above objects, there is provided a radar apparatus comprising N transmission antennas; a transmission circuit unit having N transmission RF ports; N power dividers connected between the N transmission antennas and the N transmission RF ports; a Power combiner connected to the N power dividers; and a reception circuit unit connected to the power combiner and to one or more reception antenna.

Each of the power dividers inputs power outputted from the corresponding transmission RF port through an input point, and divides the input power into a first power and a second power according to a predetermined power division ratio, thereby outputting the first power to the corresponding transmission antenna through a first output point and outputting the second power to the power combiner through a second output point.

The power combiner combines the second powers outputted through the second output point of each of the power divider, and inputs the combined second power to the reception circuit unit.

The transmission circuit unit outputs power through one of the N transmission RF ports at a time.

When a transmission signal corresponding to the first power outputted through the first output point of each of the power dividers is transmitted through the corresponding transmission antenna and the reception circuit unit inputs a reception signal received through the one or more reception antenna, the second power combined by the power combiner and inputted to the reception circuit unit has power corresponding to a reference transmission signal for calculating a difference between the transmission signal and the reception signal.

The transmission circuit unit includes no additional transmission RF port for outputting the reference transmission signal other than the N transmission RF ports for N transmission channels.

The power combiner may be implemented as a passive circuit on a printed circuit board.

As described above, the effect of the present invention is to provide the radar apparatus utilizing multiple transmission channels having the structure enabling multiple transmission channels only by using only the number of transmission RF ports as many as the number of the transmission channels.

BRIEF DESCRIPTION OF THE DRAWINGS

The above and other objects, features and advantages of the present invention will be more apparent from the following detailed description taken in conjunction with the accompanying drawings, in which:

FIG. 1 schematically illustrates a radar apparatus utilizing multiple transmission channels according to an exemplary embodiment of the present invention.

DETAILED DESCRIPTION OF THE PREFERRED EMBODIMENTS

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

An exemplary embodiment of the present invention illustrates a radar apparatus capable of utilizing multiple transmission channels having transmission RF ports just as many as a number of transmission channels.

The exemplary embodiment of the present invention will be described with reference to FIG. 1.

FIG. 1 schematically illustrates the radar apparatus 100 utilizing multiple transmission channels according to the exemplary embodiment of the present invention.

As shown in FIG. 1, the radar apparatus 100 utilizing multiple transmission channels according to the exemplary embodiment of the present invention includes N(N≥2) transmission antennas $Tx_1, \ldots, Tx_N$, a transmission circuit unit for outputting a transmission signal to be transmitted through one or more of the N transmission antennas $Tx_1, \ldots, Tx_N$, and a reception circuit unit inputting reception signal received through M reception antennas $Rx_1, \ldots, Rx_M$.

As shown in FIG. 1, the transmission circuit unit has N transmission RF ports $P_1, \ldots, P_N$.

Here, the N transmission RF ports $P_1, \ldots, P_N$ have a one to one correspondence with the N transmission antennas $Tx_1, \ldots, Tx_N$. That is, the transmission RF port $P_1$ corresponds to the transmission antenna $Tx_1$, the transmission RF port $P_2$ corresponds to the transmission antenna $Tx_2$, and the transmission RF port $P_N$ corresponds to the transmission antenna $Tx_N$.

As shown in FIG. 1, the radar apparatus 100 utilizing multiple transmission channels according to the exemplary embodiment of the present invention further includes N power dividers $D_1, \ldots, D_N$ each connected between each of the N transmission RF port $P_i$ ($1 \leq i \leq N$) and each of the transmission antenna $Tx_i$ ($1 \leq i \leq N$), and a power combiner C connected to all of the N power dividers The reception circuit unit is connected to the power combiner C and to M reception antennas $Rx_1, \ldots, Rx_M$, that is, one or more reception antennas $Rx_1, \ldots, Rx_M$.

As described above, each N power divider $D_i$ ($1 \leq i \leq N$) is connected between each transmission RF port $P_i$ ($1 \leq i \leq N$) and each transmission antenna $Tx_i$ ($1 \leq i \leq N$).

In more detail, as shown in FIG. 1, the power divider power dividers $D_1$ is connected between the transmission RF port $P_1$ and the transmission antenna $Tx_1$, the power divider power dividers $D_2$ is connected between the transmission RF port $P_2$ and the transmission antenna $Tx_2$ and the power divider power dividers $D_N$ is connected between the transmission RF port $P_N$ and the transmission antenna $Tx_N$.

For these connections, each power divider $D_i$ ($1 \leq i \leq N$), as shown in FIG. 1, inputs power outputted from each corresponding transmission RF port through an input point I, and divides the input power into a first power and a second power according to a predetermined power division ratio, and then outputs the first power to each corresponding transmission antenna through a first output point $O_1$ and outputs the second power to the power combiner C through a second output point $O_2$.

The power combiner then combines, as shown in FIG. 1, all of the second powers outputted through the second output point $O_2$ of each of the power divider $D_i$ ($1 \leq i \leq N$), and inputs the combined second power to the reception circuit unit.

The operation time of the transmission antennas of the radar apparatus 100 according to the exemplary embodiment of the present invention to transmit transmission signals $TS_1, \ldots, TS_N$ may be divided such that only one of the all transmission antennas $Tx_1, \ldots, Tx_N$ may transmit one of the transmission signals $TS_1, \ldots, TS_N$ at a certain time.

Therefore, the transmission circuit unit may output power through one of the N transmission RF port $P_1, \ldots, P_N$ at a time, thus, one of the transmission signals $TS_1, \ldots, TS_N$ is outputted through one of the transmission antennas $Tx_1, \ldots, Tx_N$ corresponding to the one of the transmission RF ports $P_1, \ldots, P_N$.

Referring to FIG. 1, when a transmission signal $TS_i$ ($1 \leq i \leq N$) corresponding to the first power outputted through the first output point $O_1$ of each of the power dividers $D_i$ ($1 \leq i \leq N$) is transmitted through the corresponding transmission antenna $Tx_i$ ($1 \leq i \leq N$) and the reception circuit unit inputs reception signals $RS_j$ ($1 \leq j \leq M$) received through the M reception antennas $Rx_j$ ($1 \leq j \leq M$), the second power outputted from each of the power divider $D_i$ ($1 \leq i \leq N$) and combined by the power combiner C to be inputted to the reception circuit unit has power corresponding to a reference transmission signal $S_{LO}$ which is a reference for calculating a difference between the transmission signal $TS_i$ ($1 \leq i \leq N$) and the reception signal $RS_j$ ($1 \leq j \leq M$).

For example, when a transmission signal $TS_1$ is transmitted through the transmission antenna $Tx_1$ at a certain time, and correspondingly M reception signals $RS_1, \ldots, RS_M$ are received through the M reception antennas $RX_1, \ldots, RX_M$, then, from a difference between $TS_1$ and $RS_1$ to a difference between $TS_1$ and $RS_M$ are calculated. For this calculation, the second power divided, together with the first power corresponding to the transmission signal $TS_1$, by the power divider $D_1$ and the other second powers (power=0) divided by the other dividers $D_2, \ldots, D_N$ are combined and corresponding reference signal $S_{LO}$ is used.

When a transmission signal $TS_2$ is transmitted through the transmission antenna $Tx_2$ at another certain time, and correspondingly M reception signals $RS_1, \ldots, RS_M$ are received through the M reception antennas $RX_1, \ldots, RX_M$, then, from a difference between $TS_2$ and $RS^1$ to a difference between $TS_2$ and $RS_M$ are calculated.

As described above, the calculated differences between the transmission signals and the reception signals are inputted to an object detection processing unit (not shown) to be used for detecting a separation distance, velocity, directions and et cetera of an object.

On the contrary, the conventional radar apparatus needs, for implementing multiple transmission channels, at least one additional transmission RF port for a reference transmission signal used to calculate a difference between a transmission signal and a reception signal other than transmission RF ports as many as the number of the transmission channels for transmission signals. That is, the conventional radar apparatus comprises at least N+1 transmission RF ports for implementing the N transmission channels.

However, as described above, the radar apparatus 100 according to the exemplary embodiment of the present invention comprises only N transmission RF ports $P_1, \ldots, P_N$ for implementing the N transmission channels. That is, the transmission circuit unit includes no additional transmission RF port for outputting the reference transmission signal $S_{LO}$ other than the N transmission RF ports $P_1, \ldots, P_N$ for implementing the N transmission channels.

The construction of FIG. 1 (the transmission antennas, the reception antennas, the transmission circuit unit, the reception circuit unit, the power divider, the power combiner et cetera) is implemented on a printed circuit board.

Correspondingly, the power combiner C may be implemented as a passive circuit on the printed circuit board, thereby realizing power combining feature without high cost.

Furthermore, the N power dividers D1, . . . , DN and the power combiner C may be implemented as Wilkinson power divider. Here, the Wilkinson power divider may function as a power divider having power dividing feature or a power combiner having power combining feature by distinguishing input and output points (input and output ports).

As described above, the effect of the present invention is to provide the radar apparatus 100 utilizing multiple transmission channels having the structure enabling multiple transmission channels only by using only the number of transmission RF ports as many as the number of the transmission channels.

This enables miniaturizing of the radar apparatus 100. Further, the limited number of transmission RF ports enables no additional transmission RF port necessary for a reference transmission signal, therefore, all of the transmission RF ports may be used for the multiple transmission channels and eliminate the need for an additional circuit such as an active circuit.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units. In addition, although each of the components may be implemented as an independent hardware, some or all of the components may be selectively combined with each other, so that they can be implemented as a computer program having one or more program modules for executing some or all of the functions combined in one or more hardwares. Codes and code segments forming the computer program can be easily conceived by an ordinarily skilled person in the technical field of the present invention. Such a computer program may implement the embodiments of the present invention by being stored in a computer readable storage medium, and being read and executed by a computer. A magnetic recording medium, an optical recording medium, a carrier wave medium, or the like may be employed as the storage medium.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A radar apparatus comprising:
   N transmission antennas;
   a transmission circuit unit comprising N transmission RF ports;
   N power dividers connected between the N transmission antennas and the N transmission RF ports;
   a Power combiner connected to the N power dividers; and
   a reception circuit unit connected to the power combiner and to one or more reception antenna,
   wherein each of the power dividers inputs power outputted from the corresponding transmission RF port through an input point, and divides the input power into a first power and a second power according to a predetermined power division ratio, thereby outputting the first power to the corresponding transmission antenna through a first output point and outputting the second power to the power combiner through a second output point, and
   the power combiner combines the second powers outputted through the second output point of each of the power divider, and inputs the combined second power to the reception circuit unit.

2. The radar apparatus of claim 1, wherein the transmission circuit unit outputs power through one of the N transmission RF ports at a time.

3. The radar apparatus of claim 2, wherein when a transmission signal corresponding to the first power outputted through the first output point of each of the power dividers is transmitted through the corresponding transmission antenna and the reception circuit unit inputs a reception signal received through the one or more reception antenna,
   the second power combined by the power combiner and inputted to the reception circuit unit has power corresponding to a reference transmission signal for calculating a difference between the transmission signal and the reception signal.

4. The radar apparatus of claim 3, wherein the transmission circuit unit comprises no additional transmission RF port for outputting the reference transmission signal other than the N transmission RF ports for N transmission channels.

* * * * *